United States Patent
Washington

[19]

[11] Patent Number: 6,031,613
[45] Date of Patent: Feb. 29, 2000

[54] SYSTEM AND METHOD FOR MEASURING THE ANGULAR POSITION OF A ROTATABLY POSITIONABLE OBJECT

[75] Inventor: Richard G. Washington, Marble Falls, Tex.

[73] Assignee: Polycom, Inc., San Jose, Calif.

[21] Appl. No.: 09/179,104

[22] Filed: Oct. 26, 1998

[51] Int. Cl.[7] .................................................. G01B 11/27
[52] U.S. Cl. .......................................... 356/364; 356/138
[58] Field of Search ..................................... 356/138, 364, 356/368, 369, 153, 139.04; G01B 11/27; G01D 5/34

[56] References Cited

U.S. PATENT DOCUMENTS

| | | | |
|---|---|---|---|
| 5,815,269 | 9/1998 | Crabb et al. | 356/364 |
| 5,819,207 | 10/1998 | Takagi | 702/153 |

FOREIGN PATENT DOCUMENTS

| | | | |
|---|---|---|---|
| 401240821 | 9/1989 | Japan | G01D 5/34 |

OTHER PUBLICATIONS

Large Diameter (56mm) Housed Two and Three Channel Optical Encoders, Technical Data–Hewlett–Packard Co. 1977. Fifteen (15) pages.

Primary Examiner—Robert H. Kim
Assistant Examiner—Layla G. Lauchman
Attorney, Agent, or Firm—Carr & Ferrell LLP

[57] ABSTRACT

A system and method for measuring the angular position of a rotatably positionable object are disclosed. The system includes a rotating polarizing filter coupled to the rotatably positionable object so that the rotating polarizing filter co-rotates with the rotatably positionable object. Light generated by a light source is directed along a path through the rotating polarizing filter and through a stationary polarizing filter. In this configuration, the intensity of the light passed through the rotating and stationary polarizing filters varies according to the angular position of the rotatably positionable object. A light sensor senses the intensity of the light passed through the rotating and stationary polarizing filters. Based on the intensity of the light, as sensed by the light sensor, a processor determines the angular position of the rotatably positionable object.

In one embodiment, first and second stationary polarizing filters are provided having angularly offset orientations. The intensity of the light passing through the first and second stationary polarizing filters produces first and second responses that differ in phase to permit measurement of rotatable object having a range of angular rotation greater than about 70 or 80 degrees. In another embodiment, a light source transmits light through a single rotating neutral variable density filter such that the intensity of the light passing through the variable density filter varies according to the angular position of the variable density filter.

24 Claims, 5 Drawing Sheets

SYSTEM AND METHOD FOR MEASURING THE ANGULAR POSITION OF A ROTATABLY POSITIONABLE OBJECT

BACKGROUND OF THE INVENTION

1. Field of the Invention

The present invention relates generally to measuring angular position, and more particularly to sensing and encoding the angular position of a rotatably positionable object.

2. Description of the Background Art

Frequently, it is necessary or desirable to monitor the angular position of a rotatably positionable object, such as a rotating shaft. For example, numerous devices employ a rotating shaft driven by an electric motor to position device components according to the direction and amount of shaft rotation. Consequently, because the position of such components depends on the amount and direction of shaft rotation, a device may monitor the current position of a component by monitoring the angular position of the shaft.

A commonly used method of measuring the angular position of a rotatably positionable object is to use a slotted optical encoder. A conventional slotted optical encoder normally includes a very fine sheet of metal with elongated thin slots formed therein. The fine sheet of metal is then mounted on the rotatably positionable object such that it co-rotates therewith. A sensor, positioned on an opposite side of the metal sheet, detects and counts the pulses of light that pass through the thin slots as the object rotates.

A primary limitation of this method of measuring angular position is that it is expensive. Indeed, the cost of the thin sheet of slotted metal and of a sensor sufficiently sensitive to detect and count the light pulses passing through such thin slots is relatively high. Additionally, conventional slotted optical encoders also require an analog to digital (A/D) converter to convert the sensor readings to a digital signal for processing purposes. This requirement for an A/D converter further increases the cost of the slotted optical encoder approach.

Other conventional systems and methods for accurately and effectively measuring the angular position of a rotatably positionable object are typically either too fragile or too expensive to be commercially useful in many applications. Because electronic equipment is frequently transported from one location to another, it is desirable that such equipment be sufficiently rugged to withstand a reasonable degree of handling by transport personnel. Many types of electronic equipment must also withstand rough treatment by end users. In addition, it is also advantageous that the price of the angular position sensing components of a system not comprise a large portion of the cost of producing the system.

Accordingly, a need exists for a relatively inexpensive system and method for sensing the angular position of a rotatably positionable object. An additional need exists for an angular position sensing system and method that is robust and can withstand rough handling by users. Moreover, a need exists for a system and method for sensing the angular position of a rotatably positionable object that does not require an A/D converter.

SUMMARY OF THE INVENTION

The present invention overcomes or substantially alleviates prior problems associated with systems and methods for sensing and encoding the angular position of a rotatably positionable object. In general, the present system uses a rotating polarizing filter mounted on a rotatably positionable object for co-rotation therewith and a stationary polarizing filter disposed between a light source and a light sensor. In this configuration, the intensity of the light passing through the rotating and stationary polarizing filters varies according to the angular position of the rotatably positionable object. Hence, the angular position of the rotatably positionable object can be easily determined by measuring the intensity of the light passing through the rotating and stationary polarizing filters.

In a presently preferred embodiment, the system includes a randomly polarized light source, a rotating polarizing filter mounted on a rotatably positionable object for co-rotation therewith, a light sensor, and a stationary polarizing filter interposed between the light source and the light sensor. The light source generates light, at least a portion of which is passed through the rotating and stationary polarizing filters. The light sensor then senses the intensity of the light after the light has passed through the rotating and stationary polarizing filters. As the rotating polarizing filter is rotated relative to the stationary polarizing filter, the intensity of the light passing through the rotating and stationary polarizing filters varies according to their relative angular orientations. A processor coupled to the light sensor then determines the angular position of the rotatably positionable object based on the intensity of the light as measured by the light sensor.

Preferably, the light sensor is an intensity to frequency converter that senses light intensity and responsively generates a signal having a frequency proportional to the sensed light intensity. Indeed, intensity to frequency converters are typically inexpensive and rugged. Additionally, by using an intensity to frequency converter, an A/D converter is not necessary to convert the light sensor readings to a digital signal for further processing by a digital signal processor or the like, thus further lowering the cost of the present system.

The intensity of the light after passing through the rotating and stationary polarizing filters, as sensed by the light sensor, has a substantially sinusoidal response to the angular position of the rotatably positionable object. That is, the intensity of the light passing through the rotating and stationary polarizing filters varies in a substantially sinusoidal manner as the rotating polarizing filter is rotated relative to the stationary polarizing filter. The resulting sinusoidal response includes relatively large substantially linear regions and relatively small substantially non-linear regions.

To accommodate the non-linear regions of the response, and to enlarge the angular range of the system, the system may include a second light sensor and a second stationary polarizing filter. In this embodiment, the second stationary polarizing filter has an angularly offset orientation relative to a first stationary polarizing filter. As such, the second light sensor outputs a sinusoidal response that differs in phase from the sinusoidal response of the first light sensor. Hence, superimposing the outputs of the first and second light sensors yields two sinusoids that differ in phase. Thus, as the response curve for one of the two sensors approaches a non-linear region, the system uses data from the other sensor (which is operating in a linear region) for angular position determinations. In this manner, the system may continuously operate within a substantially linear region of one of the sinusoidal sensor responses.

In another embodiment, a rotating neutral variable density filter is mounted to the rotatably positionable object. As such, the intensity of the light passing through the neutral variable density filter varies in a substantially linear fashion with a saw tooth-shaped response with the rotation of the rotatably positionable object. Accordingly, the angular position of the rotatably positionable object may be determined according to the sensed light intensity of the light passing through the neutral variable density filter.

Other advantages and features of the present invention will be apparent from the drawings and detailed description as set forth below.

DETAILED DESCRIPTION OF THE PREFERRED EMBODIMENT

Figure 1:
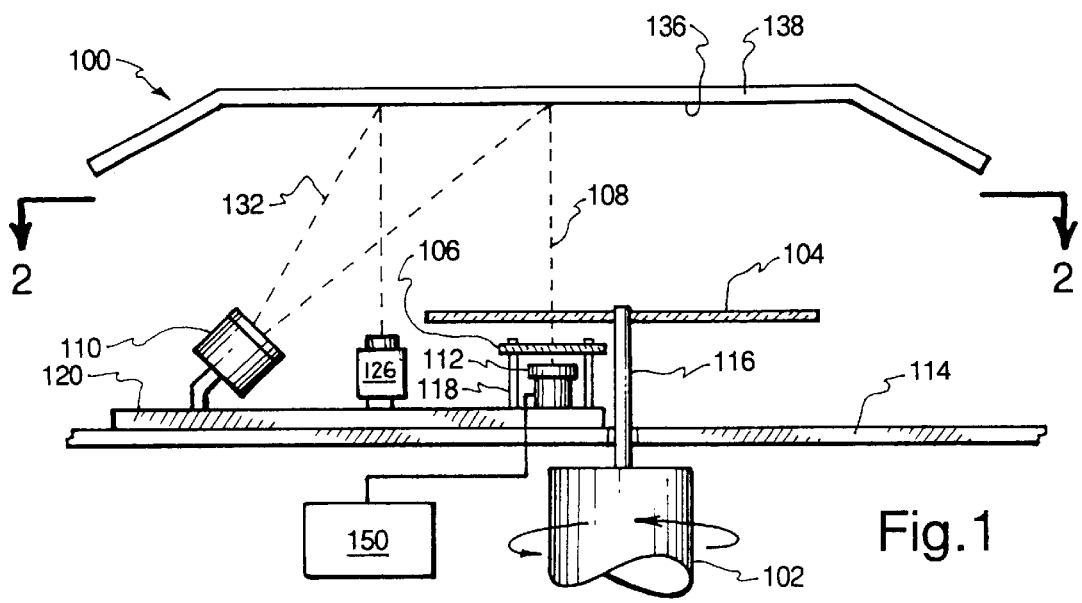
FIG. 1 is plan view of a system for measuring the angular position of a rotatably positionable object according to the present invention.
Figure 2:
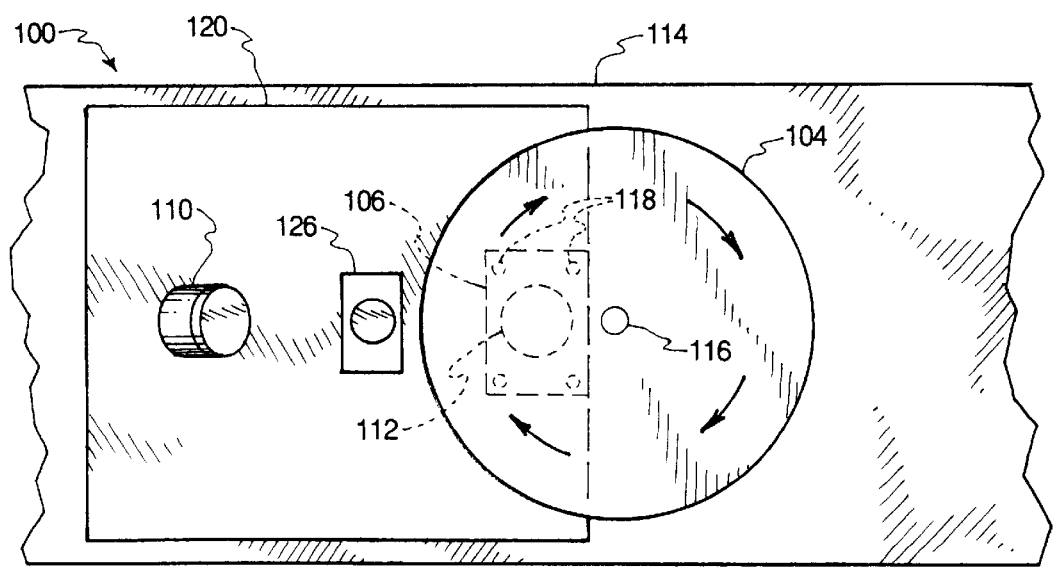
FIG. 2 is an elevation view of the system of FIG. 1 taken along the lines 2—2.
Figure 3:
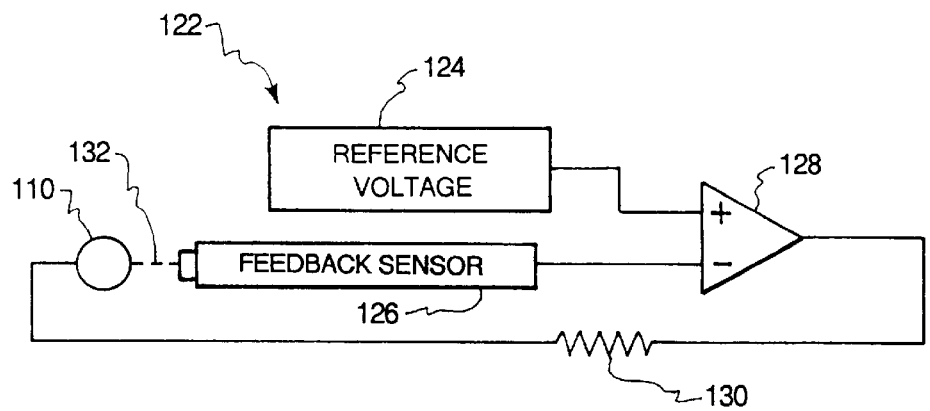
FIG. 3 is a schematic diagram of the feedback circuit of the system of FIG. 1.

The invention will now be described with reference to the accompanying drawings wherein similar parts are identified by like numerals throughout. FIGS. 1, 2, and 3 illustrate the major components of a system 100 for measuring the angular position of a rotatably positionable object 102. As shown, the system 100 generally includes a rotating polarizing filter 104, a stationary polarizing filter 106, a light source 110, and a light sensor 112. The rotating polarizing filter 104 is coupled to the rotatably positionable object 102 so that the rotating polarizing filter 104 co-rotates with the rotatably positionable object 102.

In general, light passes along a light path 108 from the light source 110 through the rotating polarizing filter 104 and the stationary polarizing filter 106 to the light sensor 112. Because the rotating polarizing filter 104 and the stationary polarizing filter 106 are formed of polarizing material, the intensity of the light passing through the polarizing filters 104 and 106 varies according to the angular position of the rotatably positionable object 102. Consequently, the angular position of the rotatably positionable object 102 can be determined from the intensity of the light passing through the polarizing filters 104 and 106, as sensed by the light sensor 112.

Specifically, the rotatably positionable object 102 is shown as a shaft rotatable about a central rotation axis and disposed within a housing 114. The rotating polarizing filter 104 is coupled to the rotatably positionable object 102 by a spindle 116, the spindle 116 being fixedly attached to and extending coaxially from the object 102. Thus, as the rotatably positionable object 102 rotates a certain amount in a certain direction, the spindle 116 rotates the rotating polarizing filter 104 by the same amount in the same direction. Those skilled in the art will appreciate that the rotating polarizing filter 104 may be coupled to the rotatably positionable object 102 in a variety of alternative configurations that permit the rotating polarizing filter 104 to co-rotate with the rotatably positionable object 102.

Preferably, the polarizing filters 104 and 106 are formed of a gray colored polarizing material having good transmission characteristics and a thickness of about 0.032 inches. For example, polarizing film sold under the part number HN31 by Polaroid Corporation has been found satisfactory in some applications. The polarizing filters 104 and 106 can also be formed of polarizing material having different color, shape, thickness, or transmission characteristics. As shown in FIGS. 1 and 2, the stationary polarizing filter 106 is secured in alignment with the sensor 112 by pins 118.

The light source 110 is shown as being mounted on a circuit board 120 and as receiving power via a feedback circuit 122 (FIG. 3). While different types of light sources may be used, the light source 110 advantageously comprises an 800 millicandela light emitting diode (LED) that emits a randomly polarized red light having a wavelength of about 660 nanometers. An LED advantageously provides a relatively rugged, inexpensive, and long-lasting light source.

The intensity of the light emitted by conventional LED light sources, however, varies with respect to temperature. Accordingly, the system 100 includes the feedback circuit 122 to regulate the intensity of the light emitted by the LED. As shown in FIG. 3, the feedback circuit 122 includes a reference voltage source 124, a feedback sensor 126, an operational amplifier 128, and the LED light source 110.

In a presently preferred embodiment, the feedback sensor 126 is an intensity to voltage sensor that senses the intensity of the light emitted along light path 132 by the light source 110 and converts the sensed light intensity to an output voltage proportional to the sensed light intensity. The operational amplifier 128 is connected to the feedback sensor 126 and to the reference voltage source 124 and compares a reference voltage supplied by the reference voltage source 124 to the output voltage of the feedback sensor 126.

If the intensity of the light emitted by the light source 110 decreases, the output voltage of the feedback sensor 126 will decrease in response. The operational amplifier 128 then detects that the output voltage of the feedback sensor 126 is less than a predetermined reference voltage associated with the predetermined light intensity. As such, the operational amplifier 128 will increase the voltage to the light source 110 across a resistor 130 to increase the intensity of the light emitted by the light source 110 until the light sensor output voltage is equal to the reference voltage. When the light sensor output voltage is equal to the reference voltage, the light source 110 is emitting light 108 at the predetermined intensity.

Conversely, if the output voltage is greater than the reference voltage, the operational amplifier 128 decreases the voltage to the light source 110 to decrease the emitted light intensity. Hence, the operational amplifier 128 drives the light source 110 in accordance with the output voltage of the feedback sensor 126. In this manner, the intensity of the light emitted by the light source 110 remains substantially constant, even in environments having fluctuating temperatures.

As shown in FIG. 1, the light emitted from the light source 110 passes through the rotating and stationary polarizing filters 104 and 106 after being reflected by an inside surface 136 of a cover 138. The inside surface 136 of the cover 138 is advantageously chrome-plated to enhance the reflection of the light emitted from the light source 110 by the inside surface 130. After the inside surface 136 reflects the light emitted from the light source 110, the light travels toward and passes through the rotating polarizing filter 104. It should be noted, however, that the system 100 could also be configured so that the light emitted from the light source 110 travels directly to the rotating polarizing filter 104 without being reflected by the inside surface 136.

The light emitted from the light source 110, and reflected by the cover inside surface 136, is directed through the rotating polarizing filter 104 to create once polarized light. The once polarized light then travels to the stationary polarizing filter 106 and passes through the stationary polarizing filter 106 to create twice polarized light. The light sensor 112 then senses the intensity of the twice polarized light.

In particular, the rotating polarizing filter 104 operates to transmit only light having a polarization in a certain plane defined by the instant orientation of the rotating polarizing filter 104. The transmitted or polarized portion of the light is then directed through the stationary polarizing filter 106. The stationary polarizing filter 106 also operates to transmit light having a polarization in a certain plane defined by the orientation of the stationary polarizing filter 106. The intensity of the light incident on the light sensor 112 is thus dependent on the relative angular orientations of the rotating polarizing filter 104 and the stationary polarizing filter 106. Specifically, if the filters 104 and 106 are oriented such that their polarizing elements are parallel to each other, then the light intensity sensed by the light sensor 112 will be at a maximum. Conversely, if the filters 104 and 106 are oriented perpendicular or orthogonal to each other, then virtually no light will pass through both filters 104 and 106 and the light intensity sensed by the light sensor 112 will be at a minimum.

The light sensor 112 is preferably an intensity to frequency converter that senses light intensity and responsively generates an output signal having frequency proportional to the sensed intensity. Employing a light to frequency converter as the light sensor 112 eliminates the need for an A/D converter to convert the light sensor output to a digital signal for processing purposes.

Alternatively, an intensity to voltage sensor could be employed as the light sensor 112. Employing a light to voltage sensor, however, would require the addition, and the expense, of an A/D converter (not shown) coupled to the light sensor 112 for converting the intensity to voltage sensor output signal to a digital signal for further processing by a digital signal processor.

A processor 150 is schematically illustrated as being coupled to the light sensor 112 for processing the output signal of the light sensor 112 and for determining the angular position of the rotatably positionable object 102 based on the light sensor output signal. In one embodiment, the processor 150 comprises a microprocessor that measures the frequency of the light sensor output signal, which is advantageously TTL compliant. Preferably, the processor 150 receives an output signal from the light sensor 112 and determines the angular position of the rotatably positionable object 102 based on the frequency of the output signal.

Figure 4:
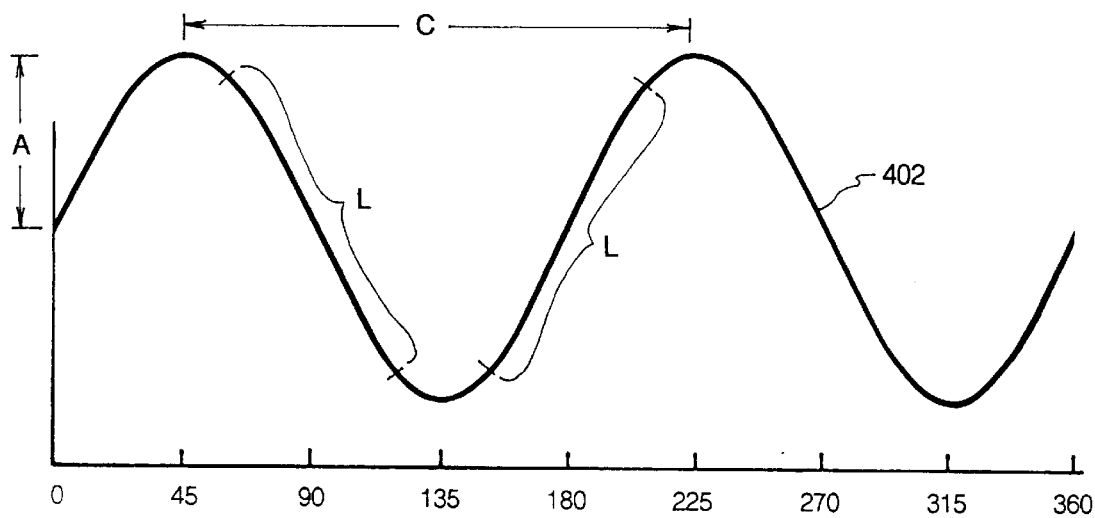
FIG. 4 illustrates the substantially sinusoidal response of the light sensor of FIG. 1 for a complete revolution of the rotatably positionable object of FIG. 1.

In general, and as shown in FIG. 4, the characteristic value of a light sensor output signal 402 (i.e. the frequency of an output signal from an intensity to frequency converter or the magnitude of an output signal from an intensity to voltage converter) varies substantially sinusoidally as a function of the angular position of the rotatably positionable object 102. The output signal 402 has a cycle C of 180 degrees and an amplitude A. Thus, as the rotatably positionable object 102 rotates through one complete revolution (360 degrees), the light sensor 112 outputs two cycles C of the output signal 402.

Because the sensor output signal 402 is substantially sinusoidal, the output signal 402 includes substantially linear regions L corresponding to about 70 to 80 degrees of rotation. Consequently, as the rotatably positionable object 102 rotates within a substantially linear region L, the angular position of the rotatably positionable object 102 can be accurately, and inexpensively, determined based on the output of the light sensor 112. In some applications, however, the resolution of the system may be decreased when operating outside of the substantially linear regions L. In this embodiment, the processor 150 maps the frequency received from the light sensor 112 into a linear function and then correlates the frequency received to an angular position of the rotatably positionable object 102. Because the substantially linear regions L comprise a range of about 70 to 80 degrees, the embodiment shown in FIGS. 1 and 2 has better resolution when used with a rotatably positionable object 102 that has an angular rotation of less than about 70 to 80 degrees.

Figure 5:
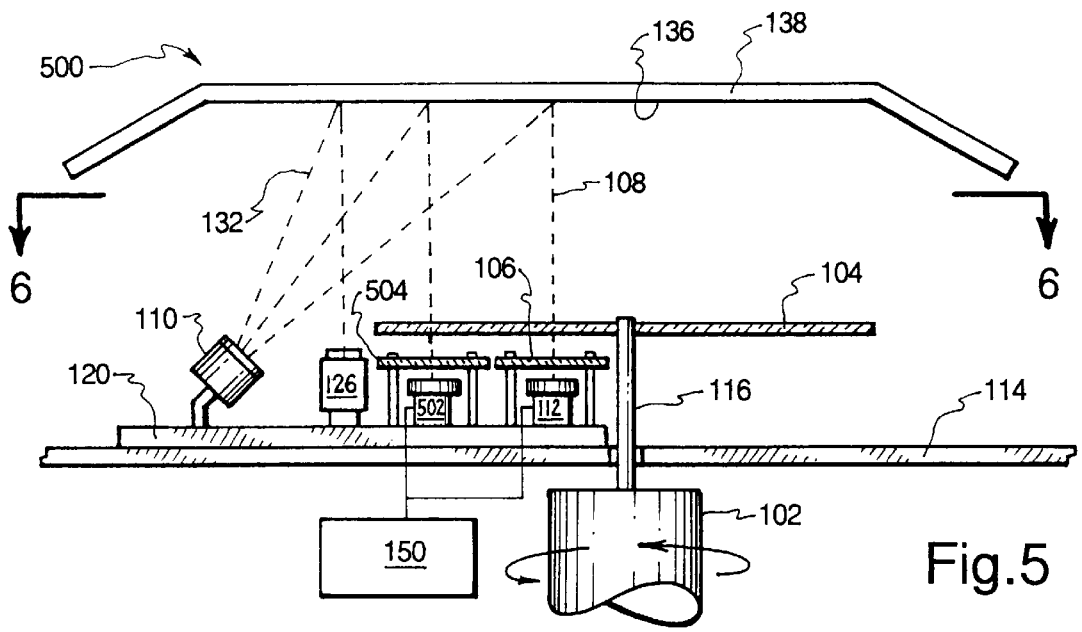
FIG. 5 is a plan view of another embodiment of a system for measuring the angular position of a rotatably positionable object according to the present invention.
Figure 6:
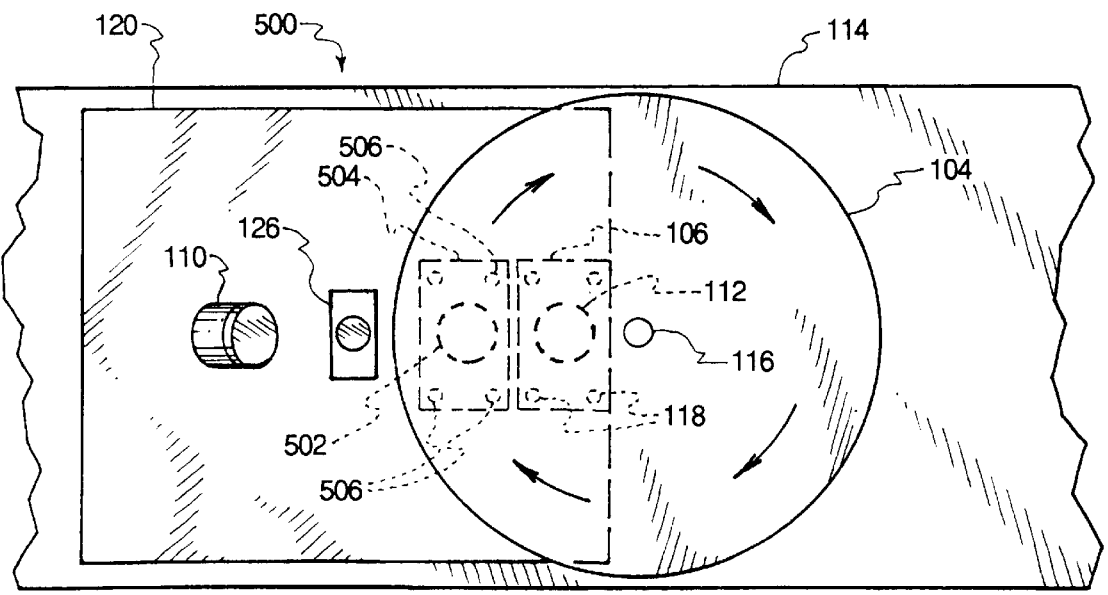
FIG. 6 is an elevation view of the system of FIG. 5 taken along the lines 6—6.

FIGS. 5 and 6 illustrate a system 500, which is another embodiment of the present invention that may be preferred in applications in which the rotatably positionable object 102 has an angular rotational range of more than about 70 to 80 degrees. In general, the system 500 shown in FIGS. 5 and 6 includes the elements of the system 100 shown in FIGS. 1–3 and described above, but also includes a second light sensor 502 and a second stationary polarizing filter 504. The second stationary polarizing filter 504 is maintained in alignment with the second light sensor 502 by pins 506.

Importantly, in this embodiment, the second stationary polarizing filter 504 is oriented differently from the orientation of the stationary filter 106 so that the responses of the light sensors 112 and 502 will differ in phase. Preferably, the stationary polarizing filters 106 and 504 are oriented, or staggered, about 45 degrees apart so that the sinusoidal response of the outputs from the light sensors 112 and 502 will be out of phase by about 45 degrees.

Figure 7:
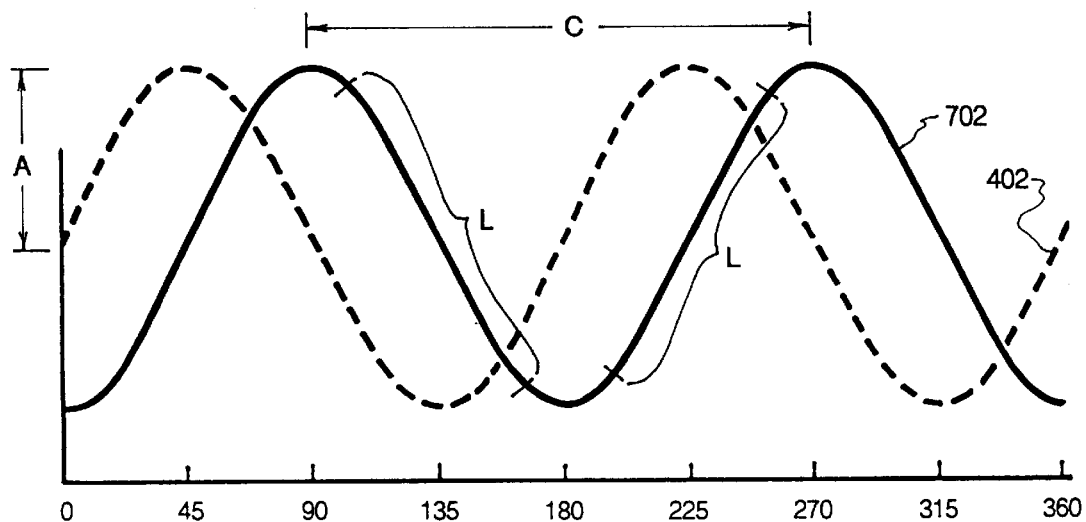
FIG. 7 illustrates the substantially sinusoidal responses of the light sensors of FIG. 5 in response to a complete revolution of the rotatably positionable object with the responses superimposed on each other.

FIG. 7 illustrates the sinusoidal responses 402 and 702 of the respective light sensors 112 and 502 superimposed on each other. As shown, the sinusoidal response 402 (illustrated as a dotted curve), of the light sensor 112 is the same as the sinusoidal response 402 of FIG. 4 and discussed above. The sinusoidal response 702 of the second light sensor 502 is superimposed on the sinusoidal response 402. The sinusoidal responses 402 and 702 have substantially the same amplitude A and cycle C, but differ in phase by about 45 degrees. In a manner identical to that of the sinusoidal response 402, the sinusoidal response 702 also comprises relatively large substantially linear regions L. In this configuration, any given angular position of the rotatably positionable object 102, will correspond to the substantially linear region L of at least one of the sinusoidal responses 402 and 702.

Because the response signals 402 and 702 are offset by about 45 degrees, when one of the sensors 112 or 502 is not operating within a substantially linear portion of the associated response, the other sensor will be operating in a substantially linear portion of its response. Thus, for each angular position of the rotatably positionable object 102, at least one of the sensors 112 or 502 will be operating in a substantially linear region L.

Accordingly, the processor 150 selectively switches back and forth between the responses 402 and 702 in monitoring the angular position of the rotatably positionable object 102. In this manner, the processor 150 is always using a substantially linear region L of a sensor response.

In operation, the processor 150 switches between the sensor responses 402 and 702 based on the amplitude of the responses. That is, as the processor 150 approaches about ±90 percent of the amplitude A of a sensor response currently being used by the processor 150, the processor 150 switches to the other sensor response. The processor 150 continues to switch back and forth between the responses 402 and 702 (or between the sensors 112 and 502) in this manner as the rotatably positionable object 102 rotates. By counting the number of times the processor 150 switches between the responses 402 and 702, the processor 150 can monitor the number of revolutions made by the rotatably positionable object 102 as well as its current angular position.

Figure 8:
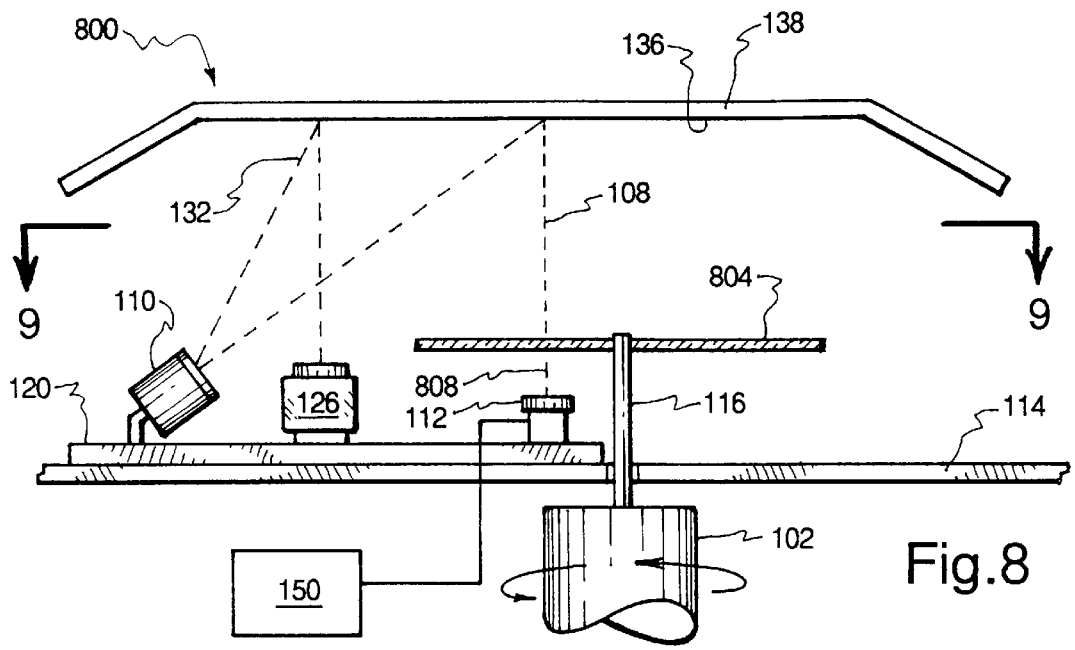
FIG. 8 is a plan view of yet another embodiment of a system for measuring the angular position of rotatably positionable object according to the present invention.
Figure 9:
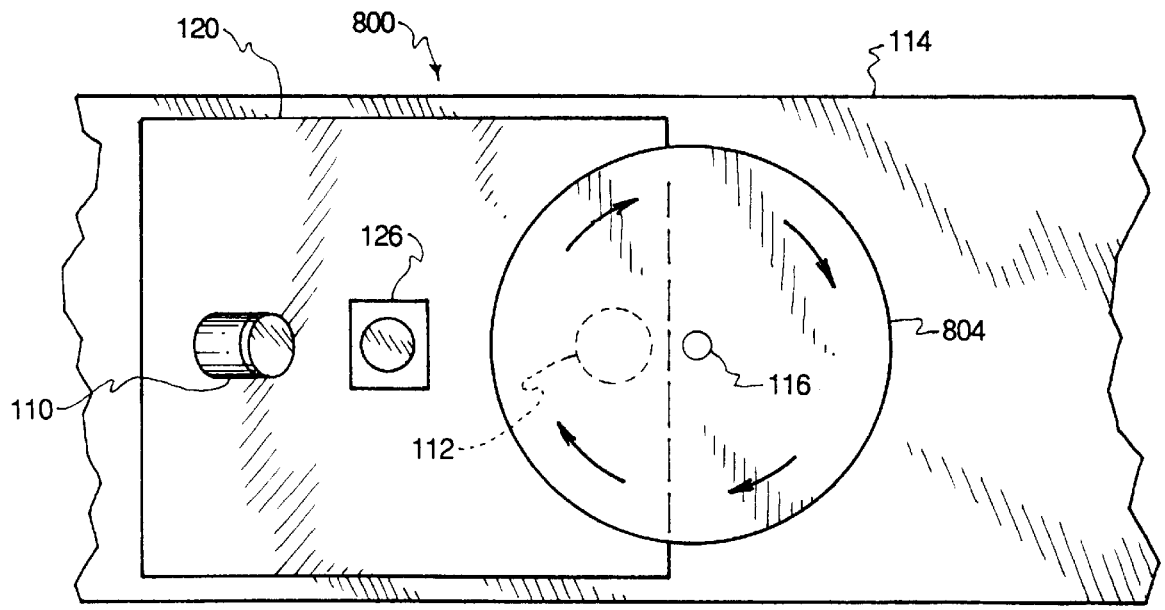
FIG. 9 is an elevation view of the system of FIG. 8 taken along the lines 9—9.

FIGS. 8 and 9 illustrate a system 800, which is yet another embodiment of the present invention. As shown, the system 800 generally includes a neutral variable density filter 804 coupled to the rotatably positionable object 102 via the spindle 116, the light sensor 112, and the light source 110. The variable density filter 804 has a filter density that varies at a constant rate radially about the filter 804. Consequently, the intensity of the light to the light sensor 112 varies in a substantially linear fashion as the neutral variable density filter 602 rotates in response to the rotation of the rotatably positionable object 102.

In particular, the sensor 112, the light source 110, and the feedback sensor 126 are mounted on the circuit board 120 in a manner identical to that shown in FIGS. 1 and 2 and described above. Likewise, the processor 150 is schematically shown as being coupled to the sensor 112 as described above. In contrast with the system 100, however, the system 800 illustrated in FIGS. 8 and 9 does not employ a stationary filter. By virtue of the neutral variable density characteristic of the filter 804, the intensity of the light 808 passing through the filter 804 varies in a substantially linear fashion with a saw tooth-shaped response with the rotation of the filter 804 as described in more detail below in connection with FIG. 10.

The light source 110 is driven in response to feedback sensor 126 in the same manner as discussed above in connection with FIG. 3. In addition, the light sensor 112 is configured and operates in the same manner as the light sensor 112 shown in FIGS. 1 and 2 and discussed above. Hence, no further description of these components is necessary.

Figure 10:
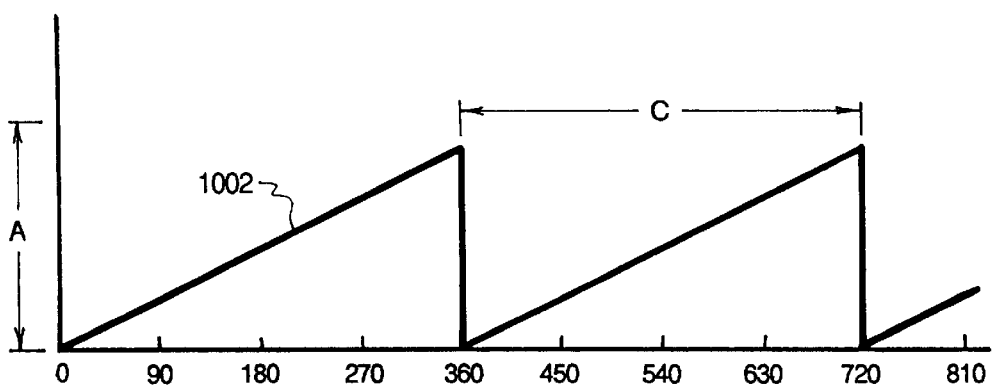
FIG. 10 illustrates the saw tooth-shaped response of the light sensor of FIG. 8 for two complete revolutions of the rotatably positionable object of FIG. 8.

In general, and as shown in FIG. 10, an output signal 1002 of the light intensity sensor 112 of FIGS. 8 and 9 varies linearly as a saw tooth-shaped function of the angular position of the rotatably positionable object 102. The output signal 1002 has a cycle C of 360 degrees and an amplitude A. Those skilled in the art will appreciate that the output responses 1002 and 402 (FIG. 4) may have different amplitudes A in addition to having different cycles C. Thus, as the rotatably positionable object 102 rotates through one complete revolution (360 degrees), the light sensor 112 of FIGS. 8 and 9 outputs one cycle C of the output signal 1002.

Accordingly, as the rotatably positionable object 102 rotates, the neutral variable density filter 804 varies the intensity of the light 808 passing therethrough according to the angular position of the rotatably positionable object 102. The light sensor 112 senses the varying light intensity and converts the light intensity to frequency. The processor 150 then correlates the output signal 1002 of the sensor 112 to an angular position of the rotatably positionable object 102 as discussed above.

The invention has been described above with reference to a specific embodiment. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An angular position measurement system for determining an angular position of a rotatably positionable object, comprising:
   a light source for transmitting light along a light path;
   a feedback circuit coupled to the light source for regulating the intensity of light emitted by the light source;
   a rotating polarizing filter positioned along the light path and coupled to the rotatably positionable object for co-rotation therewith;
   a stationary polarizing filter positioned along the light path; and
   a light sensor positioned along the light path for sensing an light intensity of the light transmitted through the rotating polarizing filter and the stationary polarizing filter to permit determination of the angular position of the object.

2. An angular position measurement system according to claim 1 wherein the light sensor comprises an intensity to frequency converter.

3. An angular position measurement system according to claim 1 wherein the light sensor comprises an intensity to voltage converter.

4. An angular position measurement system according to claim 1 wherein the stationary polarizing filter is interposed between the rotating filter and the light sensor.

5. An angular position measurement system according to claim 1 wherein the light source comprises a light emitting diode.

6. An angular position measurement system according to claim 1 further comprising a cover positioned adjacent to the rotating polarizing filter to prevent external light from passing through the rotating polarizing filter, the cover having a reflective inside surface for reflecting the light from the light source toward the rotating and stationary polarizing filters.

7. An angular position measurement system according to claim 1 further comprising a processor coupled to the light sensor configured to determine the angular position of the rotatably positionable object based on an output signal received from the light sensor.

8. An angular position measurement system according to claim 1 wherein the rotatably positionable object further comprises a shaft configured to rotate about a central longitudinal axis.

9. An angular position measurement system for determining an angular position of a rotatably positionable object, comprising:
   a light source for transmitting light along first and second light paths;
   a rotating polarizing filter positioned along the first and second light paths and coupled to the rotatably positionable object for co-rotation therewith;

a first stationary polarizing filter positioned along the first light path;

a first light sensor positioned along the light path for sensing a first intensity of the light transmitted through the rotating polarizing filter and the first stationary polarizing filter to permit determination of the angular position of the object;

a second stationary polarizing filter positioned along the second light path, the second stationary polarizing filter having an orientation angularly offset from the first stationary polarizing filter;

a second light sensor positioned along the light path for sensing a second intensity of the light transmitted through the rotating polarizing filter and the second stationary polarizing filter to permit determination of the angular position of the object; and a processor coupled to the first and second light sensors and configured to selectively employ either an output from the first light sensor or an output from the second light sensor, depending on the output of the light sensor currently employed, to determine the angular position of the object.

10. An angular position measurement system according to claim 9 wherein the first and second light sensors comprise intensity to frequency converters.

11. An angular position measurement system according to claim 9 wherein the first and second light sensors comprise intensity to voltage converters.

12. An angular position measurement system according to claim 9 wherein the first and second stationary polarizing filters are interposed between the rotating filter and the first and second light sensors respectively.

13. An angular position measurement system according to claim 9 wherein the light source comprises a light emitting diode.

14. An angular position measurement system according to claim 9 further comprising a feedback circuit coupled to the light source to regulate the amount of light emitted by the light source.

15. An angular position measurement system according to claim 9 further comprising cover positioned adjacent to the rotating polarizing filter to prevent external light from passing through the rotating polarizing filter, the cover having a reflective inside surface for reflecting the light from the light source toward the rotating polarizing filter.

16. An angular position measurement system according to claim 9 wherein the processor coupled to the first and second light sensors is further configured to switch from using the output of the first sensor to using the output of the second sensor based on the amplitude of the output received from the first sensor.

17. An angular position measurement system according to claim 9 wherein the rotatably positionable object further comprises a shaft configured to rotate about a central longitudinal axis.

18. A method of measuring angular position, comprising the steps of:

coupling a rotating polarizing filter to a rotatably positionable object so that the rotating polarizing filter rotates according to the rotation of the rotatably positionable object;

passing light through the rotating polarizing filter;

passing the light through a first stationary polarizing filter;

sensing a first light intensity of the light after the light has passed through the rotating polarizing filter and the first stationary polarizing filter;

passing the light through a second stationary polarizing filter;

sensing a second light intensity of the light after the light has passed through the rotating polarizing filter and the second stationary polarizing filter determining an angular position of the rotatably positionable object based on either the first light intensity or the second light intensity depending on the magnitude of an intensity currently in use.

19. A method according to claim 18, wherein the step of determining further comprises determining the angular position of the rotatably positionable object based on either the first light intensity or the second light intensity depending on the angular position of the rotatably positionable object.

20. A method according to claim 18, further comprising the step of reflecting the light off a reflective surface prior to the step of passing light through the rotating polarizing filter.

21. A system for measuring angular position, comprising:

means for coupling a rotating polarizing filter to a rotatably positionable object so that the rotating polarizing filter rotates according to the rotation of the rotatably positionable object;

means for passing light through the rotating polarizing filter;

means for passing the light through a first stationary polarizing filter;

means for passing the light through a second stationary polarizing filter;

means for sensing a first light intensity of the light after the light has passed through the rotating polarizing filter and the first stationary polarizing filter;

means for sensing a second light intensity of the light after the light has passed through the rotating polarizing filter and the second stationary polarizing filter; and means for determining an angular position of the rotatably positionable object based on either the first light intensity or the second light intensity depending on a magnitude of a current intensity.

22. An angular position measurement system for determining an angular position of a rotatably positionable object, comprising:

a light source for transmitting light along a light path;

a rotating variable density light filter positioned along the light path and coupled to the rotatably positionable object for co-rotation therewith;

a light sensor positioned along the light path for sensing an intensity of the light transmitted through the variable density light filter to permit determination of the angular position of the rotatably positionable object.

23. A system for measuring angular position according to claim 22 wherein the light filter comprises a neutral variable density filter.

24. A system for measuring angular position according to claim 22 wherein the sensor further comprises an intensity to frequency sensor.

* * * * *